United States Patent [19]

Bersten

[11] Patent Number: 5,544,566

[45] Date of Patent: Aug. 13, 1996

[54] TWO STAGE COFFEE PLUNGER

[76] Inventor: Ian J. Bersten, 105 Roseville Av., Roseville 2069, Australia

[21] Appl. No.: 338,498

[22] PCT Filed: May 24, 1993

[86] PCT No.: PCT/AU93/00236

§ 371 Date: Nov. 16, 1994

§ 102(e) Date: Nov. 16, 1994

[87] PCT Pub. No.: WO93/24041

PCT Pub. Date: Dec. 9, 1993

[30] Foreign Application Priority Data

May 26, 1992 [AU] Australia ................... PL2623

[51] Int. Cl.$^6$ ..................................... A47J 19/00
[52] U.S. Cl. .............................. 99/287; 99/297
[58] Field of Search ............... 99/279, 287, 297; 426/432, 433

[56] References Cited

U.S. PATENT DOCUMENTS

| | | | |
|---|---|---|---|
| 204,099 | 5/1878 | Schmitz | 99/297 |
| 1,053,735 | 2/1913 | Lefevre | 99/297 |
| 1,346,485 | 7/1920 | Arrigunaga | 99/297 |
| 2,459,498 | 1/1949 | Cameron | 99/297 |
| 2,678,000 | 5/1954 | Scheidt et al. | 99/287 |

FOREIGN PATENT DOCUMENTS 852284  10/1952  Germany ........................... 99/287

*Primary Examiner*—David Scherbel
*Assistant Examiner*—Terrence R. Till

[57] ABSTRACT

A two stage coffee plunger having a movable filter element and a vertically movable baffle element for use in a vessel containing liquid and coffee grounds. The coffee filter element being hand driven through the liquid to permit passage of the liquid, but not the grounds. The baffle being independently movable between the bottom of the vessel and the filter to effect squeezing of the coffee grounds to extract coffee flavor from the grounds. The two stage coffee plunger is also designed for selective relative movement between the baffle and filter.

9 Claims, 5 Drawing Sheets

TWO STAGE COFFEE PLUNGER

TECHNICAL FIELD

This invention relates to apparatus for brewing coffee and more particularly to an improved plunger filter apparatus.

BACKGROUND ART

A typical plunger filter apparatus of the kind under discussion comprises a vessel and a plunger assembly including a filter element. The vessel is usually of glass having a cylindrical side wall and a bottom wall. The plunger assembly comprises a perforated disc, a filter element, a spider plate and a plunger shaft. The perforated disc is adapted at its periphery to slidably and sealingly engage the cylindrical side wall of the vessel and acts as a support for the filter element. The filter element is for example a mesh which is clamped between the disc and the spider plate and is of a mesh size which permits passage of liquid but substantially prevents passage of coffee grounds. The spider plate has an inner ring, an outer ring and for example three legs extending between the rings and acts as an upper retaining member for the filter element so that in use the filter is not excessively distorted or weakened. The shaft extends axially from outside the vessel successively through apertures in the lid, spider plate, filter element and threadably engages a boss of the perforated supporting disc. As the shaft is screwed into the boss, a shoulder of the shaft exerts a clamping force on the filter element between the upper spider plate and lower perforated disk.

In normal use, with the lid and plunger filter removed, ground coffee is first spooned into the vessel, boiling water is then added, and the plunger assembly is next inserted into the vessel with the filter element above the contents and the lid closing the vessel. Alternatively, the water is boiled in the glass vessel and then coffee added. The apparatus is then allowed to stand while the coffee brews. When the coffee is sufficiently brewed the plunger shaft is depressed pushing the filter mesh through the liquid whereby filtered liquid passes to the upper side of the filter and coffee grounds are pushed towards the bottom wall of the vessel. Filtered coffee can then be poured from the vessel via a lip, the coffee grounds remaining trapped between the filter element and the vessel bottom wall.

Apparatus of that kind is available in various forms. The filter element may be a plastic or wire mesh or finely perforated metal plate or the like. The plunger parts are usually adapted for easy disassembly for cleaning and reassembly and may be made in a variety of materials and shapes.

Although well-known, apparatus of the above described kind suffers from a number of deficiencies.

When water is added to ground coffee, some of the grounds tend to float forming a plug adjacent the upper surface of the liquid while others fall to the bottom. Diffusion of hot water into the plug is slow and extraction occurs mainly at the lower surface of the plug and at the bottom of the vessel. Furthermore the force required during the filtration step to move the plunger and push the plug of coffee grounds downwards is great and occassionally breaks the vessel when made of glass.

These disadvantages can be alleviated by stirring the coffee grounds with a spoon after adding the water but prior to inserting the plunger assembly. However, in that case there is a loss of flavour and aroma from the surface to the surrounding atmosphere while stirring takes place and the vessel is uncovered. For this or other reasons most consumers do not stir prior to replacing the plunger assembly and lid.

A further disadvantage which is not alleviated by stirring is that the grounds which subsequently fall to the bottom (and also those subsequently pressed to the bottom by the filter element) are swollen with water which contains concentrated flavour components and which are not readily extractable in conventional plunger apparatus because flavour components remain in the interstices of the coffee grounds.

DISCLOSURE OF THE INVENTION

It is an object of the present invention to provide an improved apparatus for preparing coffee which avoids or at least ameliorates some of the disadvantages of the prior art.

According to one aspect the invention consists in a two stage coffee plunger comprising a plunger filter of the kind adapted to filter coffee by means of a filter element in use hand driven through a liquid contained in a vessel towards a bottom wall of the vessel, and a baffle adapted for movement independently of the filter element between the filter element and the vessel bottom.

According to a second aspect the invention consists in a vessel having a tubular side wall and a bottom wall, a plunger filter comprising a filter element which permits passage of liquid while substantially preventing passage of coffee grounds, a shaft extending out of the vessel and adapted to drive the filter element from an upper part of the vessel towards the bottom wall, a baffle movable between the filter element and the bottom wall, and means operable from outside the vessel for moving the baffle independently from the filter element.

The baffle may advantageously be used to break up the floating plug of coffee grounds while the vessel is closed by its lid and to wet and disperse the coffee more uniformly throughout the brew prior to depressing the filter.

After the plunger with filter element is depressed, the baffle may also be used to extract concentrated coffee from the grounds into the brew by squeezing and/or rotating and agitating the coffee grounds between the baffle and the perforated disc supporting the filter element or the base.

BRIEF DESCRIPTION OF THE DRAWINGS

Various embodiments of the invention will now be more particularly described by way of example only with reference to the accompanying drawings wherein.

BEST MODE

Figure 1:
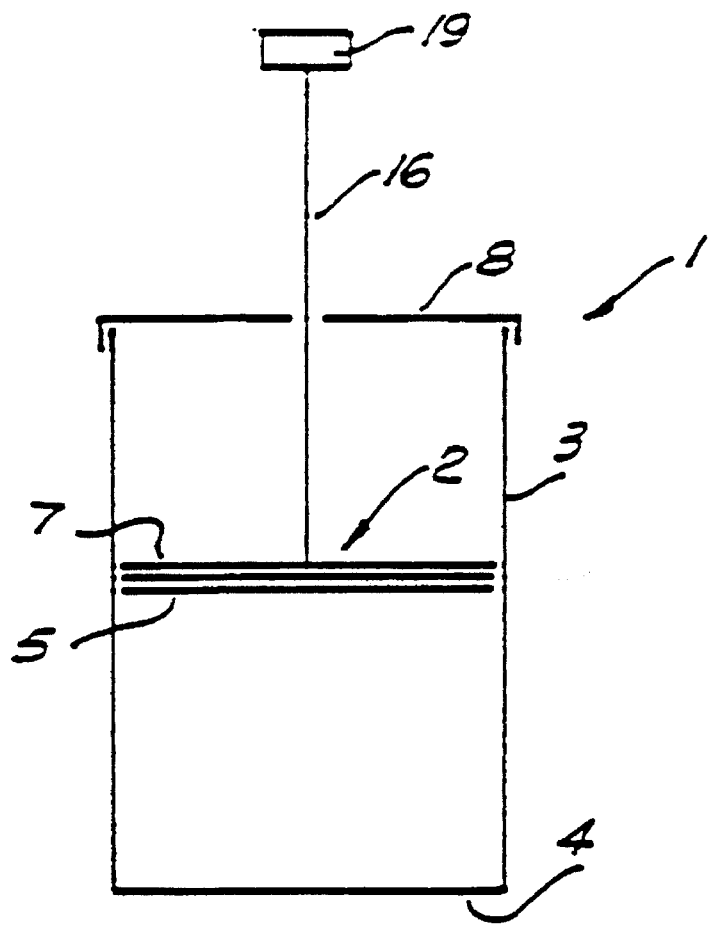
FIG. 1 is a prior art "Coffee Plunger" apparatus shown in diametric section.

In the drawings, parts having a corresponding function are identified by corresponding numerals.

Figure 2:
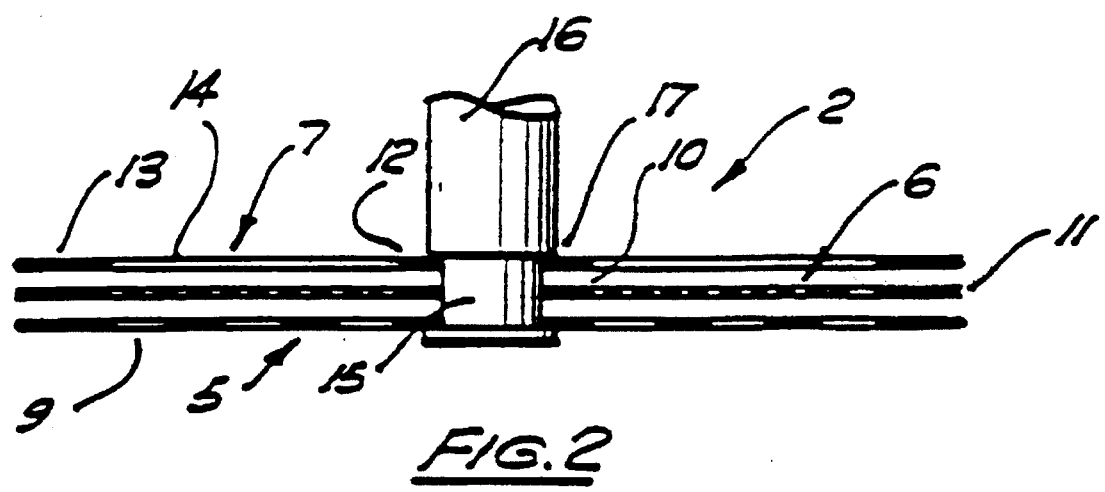
FIG. 2 shows a portion of the plunger assembly of FIG. 1.

With reference to FIGS. 1 and 2 there is shown a vessel 1 having a sidewall 3 and bottom 4.

A plunger assembly 2 comprises a perforated disk 5, a filter element 6, a spider plate 7 and a lid 8.

A portion of plunger assembly 2 is shown in more detail in FIG. 2. Perforated disk 5 is pierced by a plurality of apertures 9 and acts as a support for filter element 6.

Filter element 6 is a gauze reinforced at an inner ring 10 and outer ring 11, or may be a second perforated plate of suitably fine aperture.

Spider 7 likewise consists of an inner ring 12 and outer ring 13 with for example three radially extending equi-angularly spaced arms 14 and acts to retain the filter element against disk 5. Clamping force is provided by screwing an end 15 of plunger shaft 16 into a threaded socket of plate 5 so that shoulder 17 engages ring 12 of spider 7.

Shaft 16 extends axially through an aperture in lid 8 and is provided with a handle or knob 19.

Figure 3:
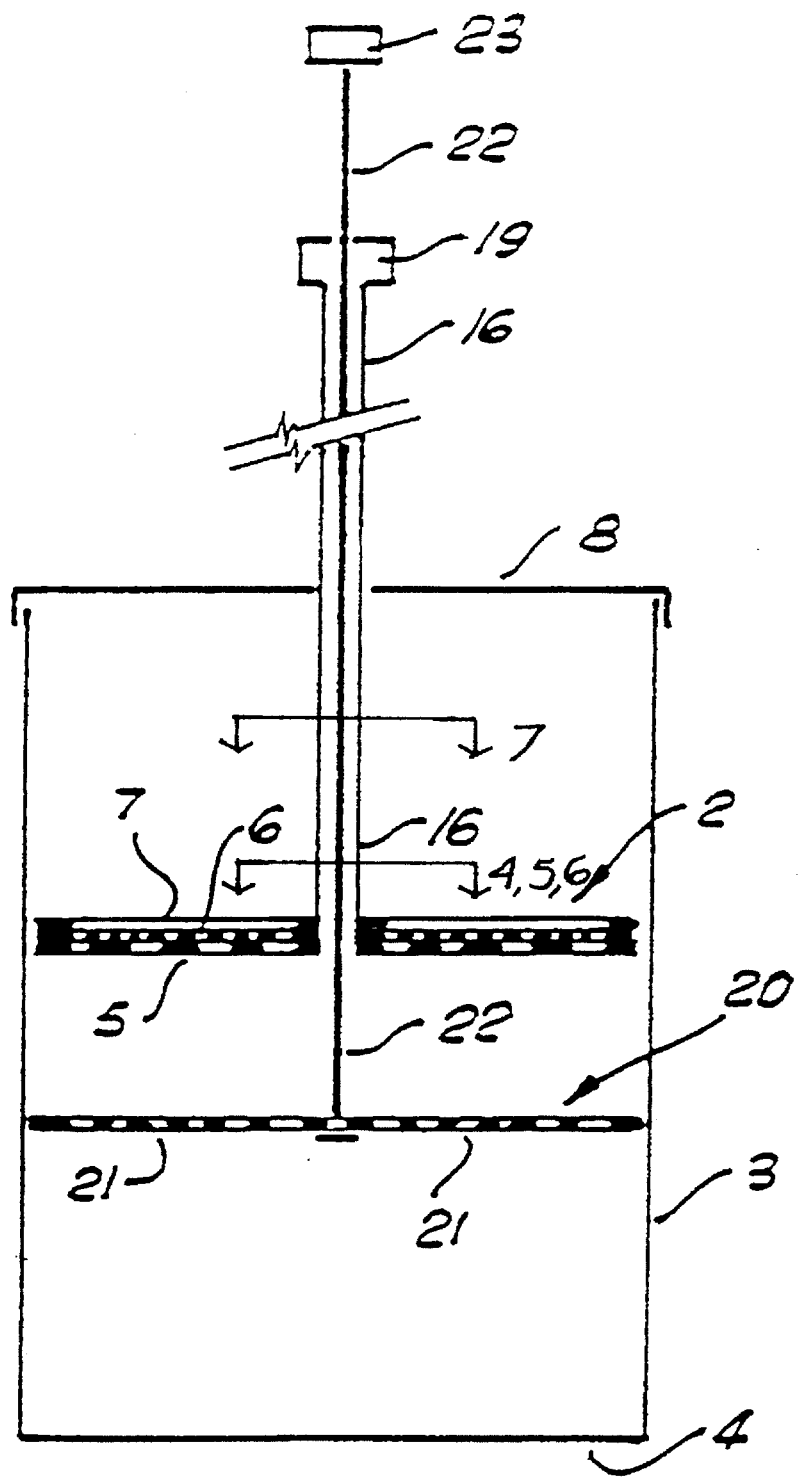
FIG. 3 shows schematically a first embodiment of the invention.

With reference to FIG. 3, there is shown schematically a first embodiment of the invention.

The first embodiment comprises a conventional plunger filter apparatus of the kind previously described but differing from the usual apparatus in that plunger shaft 16 is a hollow tubular shaft. In this embodiment there is provided a baffle 20 in the form of a circular steel disc having a diameter providing a clearance between the disc outer circumference and the side wall of the vessel. Baffle 20 is perforated with a plurality of apertures 21 each of approximately from 2 mm to 10 mm in diameter and is mounted at the end of a second shaft 22 ("baffle shaft") which extends coaxially and slidably through plunger shaft 16. The baffle plate 20 is thereby mounted with respect to the plunger so that the baffle plate underlies the filter element 6 and is moveable with respect thereto. Desirably the baffle shaft 22 is provided with a handle 23 at the end remote from the baffle plate 20, it being understood that the baffle handle 23 and/or baffle plate 20 are demountable (for example by threaded attachment) to permit the baffle shaft 22 to extend through the hollow plunger shaft 16.

In use, with lid, plunger and baffle assembly removed from the vessel, coffee grounds are placed in the vessel and boiling water added. Alternatively, the water is boiled in the vessel by conventional means such as microwaving, and coffee grounds are then added. Desirably, the lid 8 is then replaced with the plunger filter assembly 5, 6, 7 and baffle plate 20 inserted in the vessel, baffle plate lowermost. The filter assembly 5, 6, 7 is retained in the upper part of the vessel above the liquid by resilient engagement with the side wall. Baffle 20 is free to be moved through the liquid but is desirably initially retained above the liquid. The coffee grounds float to the top of the liquid forming a layer or plug of coffee grounds at the upper liquid level. Baffle 20 is then moved by means of baffle shaft 22 through the layer of coffee grounds so as to break up the layer and to disperse the grounds throughout the coffee. During this operation the filter assembly 5, 6, 7 remains stationery above the liquid. Baffle plate 20 may then be allowed to rest on the vessel bottom wall 4 until the coffee is brewed or, if preferred, the step of coffee ground dispersal may be repeated.

When the coffee is brewed, the filter assembly 5, 6, 7 which has remained in the upper part of the vessel is depressed towards the bottom wall 4 pushing the coffee grounds downwardly towards the vessel floor and baffle plate. If desired the filtered coffee above the filter element may be poured off but preferably baffle plate 20 is now used to extract coffee flavors from the coffee grounds by pressing the grounds between the baffle plate and the support plate of the filter element.

Figure 4:
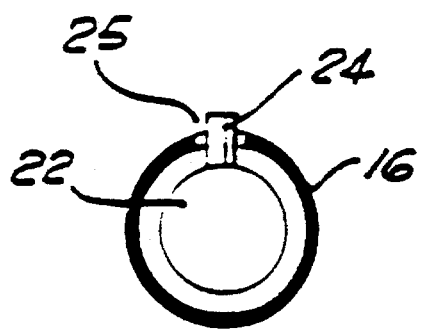
FIG. 4 shows schematically a cross-section of shafts 16, 22 of a second embodiment of the invention.
Figure 5:
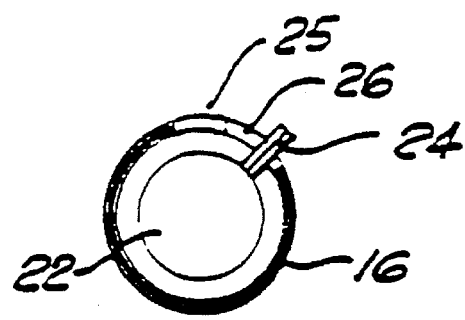
FIG. 5 shows another cross-section of shafts 16, 22 of the second embodiment.
Figure 6:
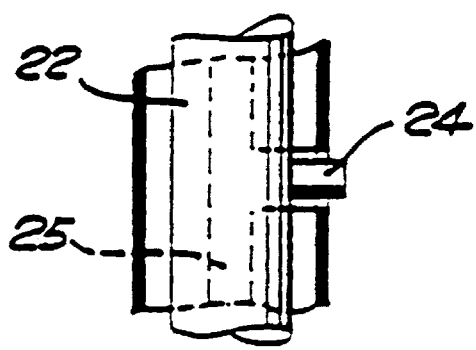
FIG. 6 shows a fragmentary elevation of the shafts of the second embodiment.

In a more elaborate second embodiment of which a plan cross section of the baffle shaft 22 is shown in FIG. 4, 5 a lateral projection 24 extends into a longitudinal slot 25 formed in the tubular side wall of hollow plunger shaft 16. The longitudinal slot 25 has one or more communicating branch slots 26 extending in a circumferential direction. This arrangement shown in fragmentary elevation in FIG. 6 permits the baffle shaft 22 to be locked in a bayonet fitting manner at one or more extensions relative to the plunger shaft 16. The baffle plate 20 may be thus retained adjacent the filter assembly 5, 6, 7 when the lid is initially fitted in place on the vessel. A twist to the baffle shaft 22 releases the baffle shaft 22 for axial translation relative the plunger shaft 16 and allows the baffle plate to be moved independently of the filter element.

Figure 7:
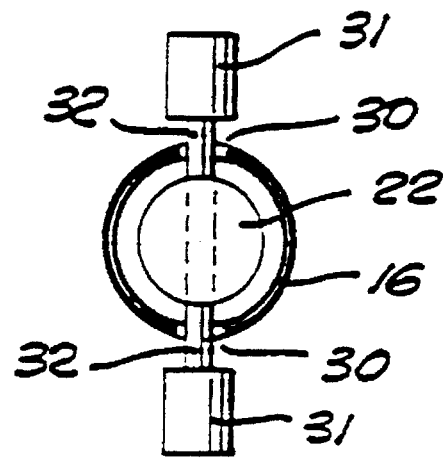
FIG. 7 shows a third embodiment of the invention.

In yet another embodiment (FIG. 7) the hollow plunger shaft 16 may be split by a pair of diametrically opposite longitudinal slots 30 extending from adjacent the filter assembly 5, 6, 7 to adjacent the handle end 19 of the plunger shaft 16. The baffle shaft 22 may have handles 31 extending laterally on opposite sides of plunger shaft 16 and each connected to baffle shaft 22 via a pin 32 extending radially through longitudinal slot 30 of the plunger shaft whereby the baffle shaft may be handle-driven independently of the plunger shaft. This embodiment has the advantage that the shaft length of the baffle shaft is reduced in comparison with the first embodiment.

Figure 8:
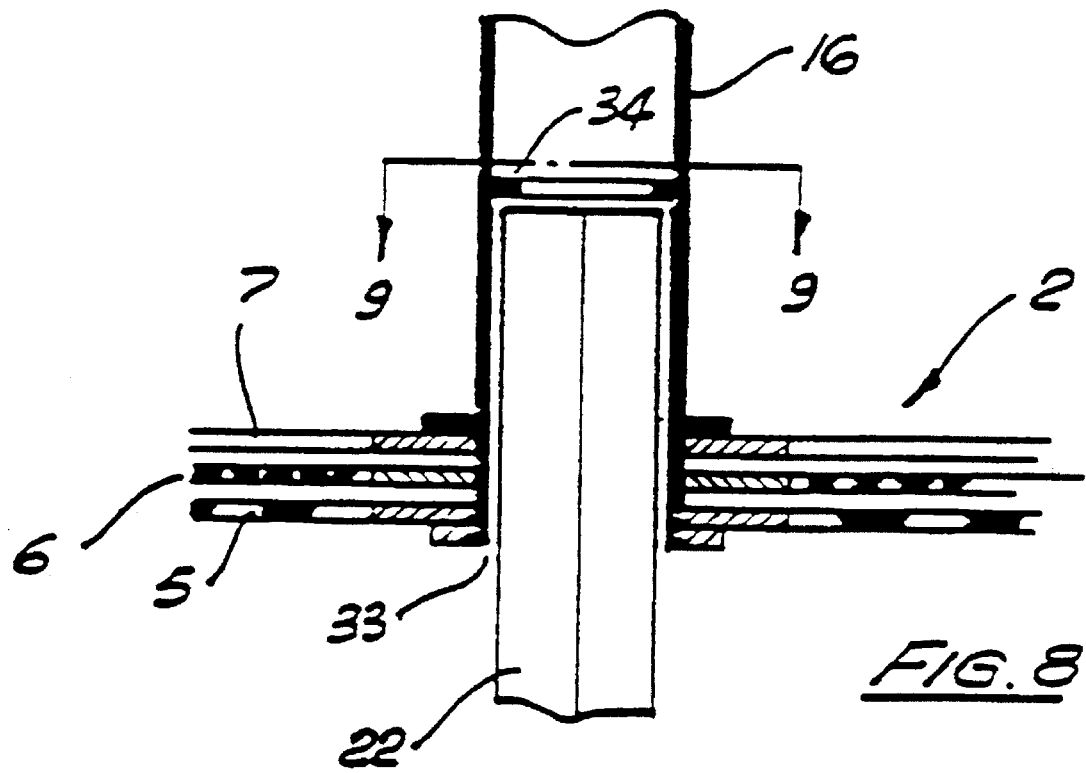
FIGS. 8, 9 show schematically a fourth embodiment of the invention.
Figure 9:
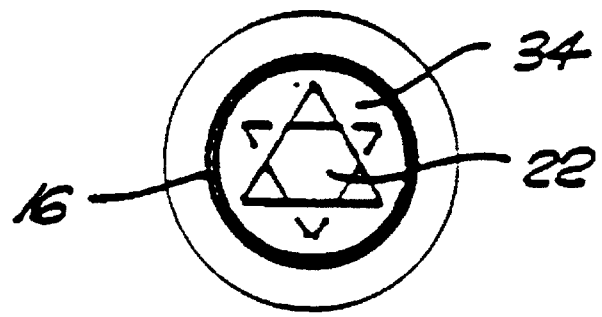

In another embodiment (FIGS. 8, 9) the plunger shaft 16 is hollow, tubular and of a circular cross-section at its lower end mouth 33 which opens to below the filter element of the plunger. At a distance of for example from 3 cm to 5 cm from the mouth, the internal cross-section of the hollow plunger shaft changes to a triangular cross-section at plate 34. Baffle 20 is attached to a baffle shaft 22 of triangular cross-section which corresponds as a clearance fit to the triangular cross-section of plunger shaft 22. The upper end of the baffle shaft is initially held in the circular cross-section mouth end of the plunger shaft for example by a resilient collar not illustrated and with the triangular cross-section of the baffle shaft out of register with the triangular cross-section of the plunger shaft. After the baffle has been used to disperse the coffee grounds and the coffee is brewed, the plunger shaft may be rotated so that it is brought into register with the baffle shaft allowing the plunger and incorporated filter element to be depressed. Cross sections other than triangular e.g. square or star shaped may be likewise employed. In another embodiment not illustrated the upper end of the baffle shaft is initially captured within the plunger shaft and retained in a retracted position for example by a latch or spring-loaded catch. When released the baffle disperses the coffee plug by sinking through the grounds under gravity.

In yet another embodiment not illustrated the baffle may be driven by means of a permanent magnet for example a ring-shaped magnet situated outside the vessel and acting on the baffle.

Figure 10:
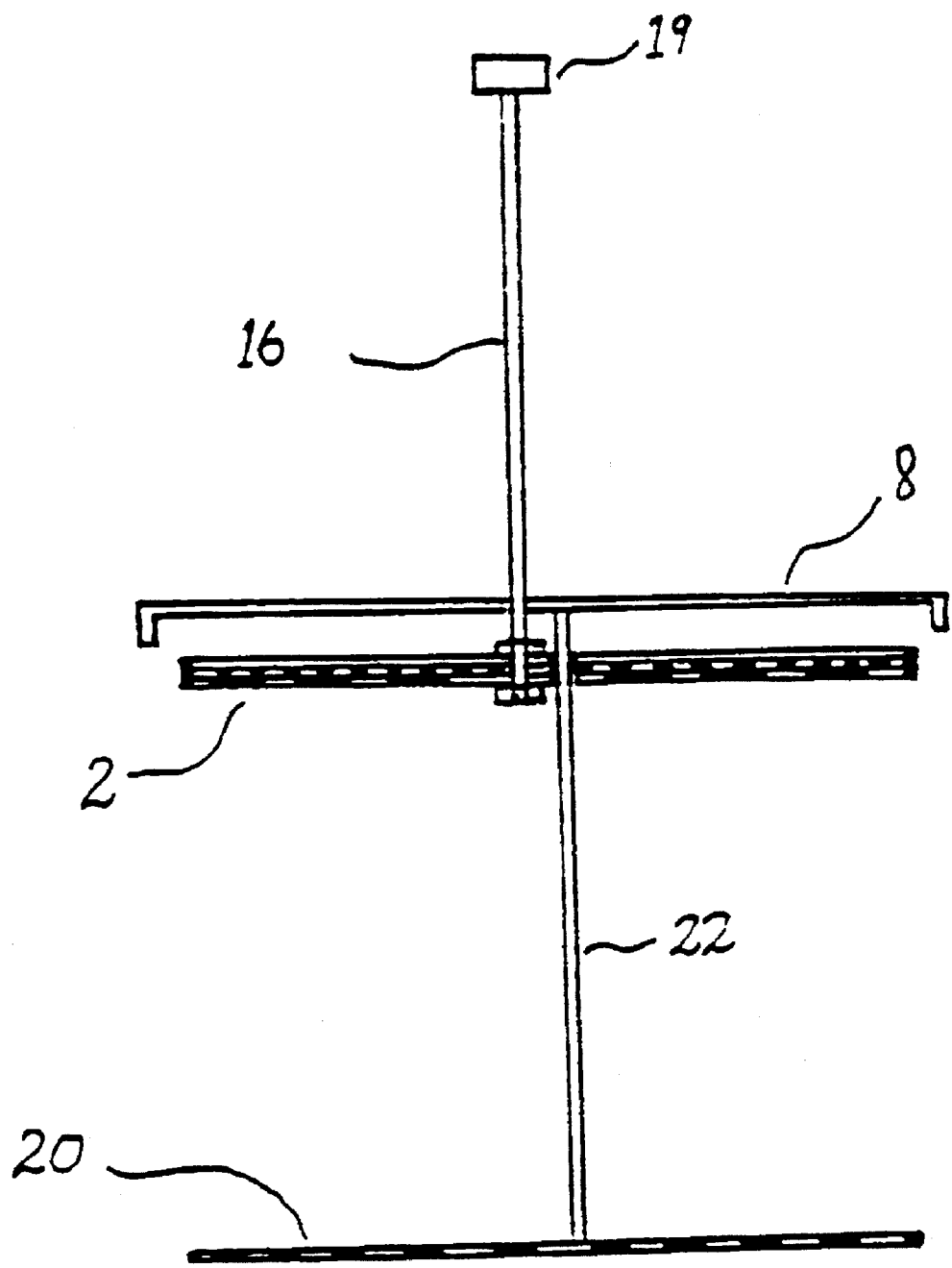
FIG. 10 shows a fifth embodiment of the invention.

A further embodiment is illustrated in FIG. 10. In this embodiment baffle 20 is rigidly fixed to lid 8 via baffle shaft 22. Accordingly, baffle 20 is driven through the liquid during the placing of lid 8 on the vessel. Thereafter, the liquid can be filtered by driving plunger assembly 2 via knob 19 and shaft 16.

It will be understood that in yet other embodiments of the invention the plunger shaft may be solid and/or the baffle shaft hollow. In other embodiments the shafts need not be coaxilly mounted but may be simply parallel. There may be more than one shaft associated with the plunger filter or baffle.

If the baffle is a perforated plate the apertures need not extend in the axial direction. For example, the apertures may have walls extending at 45° to the axial direction so that as the baffle is depressed a swirl is imparted to the liquid passing therethrough. If preferred, the apertures may be in the form of radial walls emanating from the centre.

Although in the embodiments hitherto described the baffle is in the form of a perforated plate, the baffle may take other forms for example the baffle may comprise a plurality of vanes extending radially from the shaft. The vanes may be co-planar or may extend in the axial direction and may be angled to impart swirl to the liquid or may be profiled in a propeller-like manner. In yet another embodiment the baffle shaft engages via a suitable formation with an inter-engaging spiral groove or other formation so that a top-like spin can be imparted to the baffle as it descends.

Apparatus according to the invention has the advantage that the floating blanket of ground coffee is broken up after the lid is in place and so aroma losses are minimised. Extraction of flavours from the dispersed coffee grounds proceeds more rapidly and more uniformly than when a plug of grounds forms. Accordingly, there is better utilisation of coffee grounds and less wastage. Because the coffee plug is dispersed the filter element can be more easily depressed and there is less likelihood of the glass vessel being broken upon plunging. The dispersion of the plug of coffee grounds may enable a finer grind than normal of coffee to be used because there will be less resistance to the filter than in conventional apparatus. This in turn would provide better and faster extraction of coffee flavour. In practice, after agitation there should be a settling period for the swollen grounds to sink to the bottom, thus minimising pressure against the filter and passage of microfines throughout the filter. The baffle can be manipulated after the filter element is depressed so as to further squeeze coffee concentrate from the grounds through the filter into the clarified brew.

It will be understood that in use water may be boiled in the vessel if preferred. As will be apparent to those skilled in the art from the teaching hereof, features of one embodiment may be combined with features of another. The invention may be embodied in other forms without departing from the inventive concept herein disclosed.

I claim:

1. A two stage coffee plunger for use in a vessel adapted for holding liquid, said vessel having at least one side wall and a bottom, the plunger comprising:

a plunger filter element movable within the vessel and adapted to be hand driven through the vessel, when the vessel contains liquid, said liquid containing solids dispersed therein comprising a plunger filter of the kind adapted to filter coffee, said coffee plunger being hand driven through a liquid contained in a vessel towards the bottom wall of the vessel and a baffle adapted for movement independently, vertically, of the filter element between the filter element and the vessel bottom wall.

2. A two stage coffee plunger according to claim 1, wherein the plunger filter is adapted to be driven through the liquid by a plunger filter shaft and the baffle is adapted to be moved between the filter element and the vessel bottom by an independently movable baffle shaft that in use is substantially vertical.

3. A two stage coffee plunger according to claim 2, wherein selectively releasable retaining means are disposed intermediate the plunger filter shaft and baffle shaft to axially locate the baffle with respect to the plunger filter.

4. A two stage coffee plunger according to claim 3, wherein said filter shaft is hollow and coaxially mounted about said baffle shaft.

5. A two stage coffee plunger according to claim 4, wherein the wall of said filter shaft is provided with a substantially vertical slot and said baffle shaft is provided with a projection adapted to traverse the length of the slot in response to said shafts being axially displaced with respect to each other, the wall of said filter shaft being further provided with a branch slot in communication with said vertical slot, said branch slot being adapted to receive said projection and thereby axially fix said shafts with respect to each other.

6. A two stage coffee plunger according to claim 4, further comprising, said baffle shaft having a rotational axis and a longitudinal axis, said baffle shaft being mounted concentrically within the filter shaft wherein said retaining means comprise an inwardly protruding projection disposed on said filter shaft, said protrusion providing a point of reduced internal cross section in said filter shaft, said baffle shaft being provided with a cross section such that at a first rotational position about said longitudinal axis of said baffle shaft, said baffle shaft interferes with said protrusion thereby preventing axial displacement of said baffle shaft with respect to said filler shaft and at a second rotational position about said rotational axis said baffle shaft is free to be axially displaced with respect to said filter shall.

7. A two stage coffee plunger according to claim 3, wherein the baffle is a circular disk provided with apertures.

8. A two stage coffee plunger according to claim 2, provided with a removable lid, and wherein the baffle is fixed with respect to the lid via a vertical baffle shaft.

9. A coffee plunger comprising a vessel having a tubular side wall and a bottom wall, a plunger filter comprising a filter element which permits passage of liquid while substantially preventing passage of coffee grounds, a shaft extending out of the vessel and adapted to drive the filter element from an upper part of the vessel towards the bottom wall, a baffle independent of the filter element and moveable vertically between the filter element and the bottom wall, and means operable from outside the vessel for moving the baffle independently from the filter element.

* * * * *